United States Patent
Winton et al.

(10) Patent No.: US 11,133,024 B2
(45) Date of Patent: Sep. 28, 2021

(54) BIOMETRIC PERSONALIZED AUDIO PROCESSING SYSTEM

(71) Applicant: HARMAN INTERNATIONAL INDUSTRIES, INCORPORATED, Stamford, CT (US)

(72) Inventors: Riley Winton, Canton, MI (US); Christopher Trestain, Livonia, MI (US); Christopher Ludwig, Bloomfield Hills, MI (US); Elizabeth Cibor, Huntington Woods, MI (US); Jeffrey Peil, Livonia, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 163 days.

(21) Appl. No.: 16/240,533

(22) Filed: Jan. 4, 2019

(65) Prior Publication Data
US 2019/0206423 A1    Jul. 4, 2019

Related U.S. Application Data

(60) Provisional application No. 62/613,708, filed on Jan. 4, 2018.

(51) Int. Cl.
*G10L 25/63* (2013.01)
*G06F 3/01* (2006.01)
*G10L 21/0232* (2013.01)
*G06F 16/683* (2019.01)
*G06F 3/16* (2006.01)

(52) U.S. Cl.
CPC .............. *G10L 25/63* (2013.01); *G06F 3/015* (2013.01); *G06F 3/16* (2013.01); *G06F 3/165* (2013.01); *G06F 16/683* (2019.01); *G10L 21/0232* (2013.01); *G06F 2203/011* (2013.01)

(58) Field of Classification Search
CPC .......... G06F 3/16; G06F 3/015; G06F 16/683; G06F 3/165; G06F 2203/011; G10L 21/0232; G10L 25/63
See application file for complete search history.

(56) References Cited

U.S. PATENT DOCUMENTS

| | | | |
|---|---|---|---|
| 9,356,571 B2* | 5/2016 | Burgett | H03G 5/025 |
| 9,557,814 B2* | 1/2017 | Weising | A63F 13/40 |
| 10,587,967 B2* | 3/2020 | Osborne | G16H 20/40 |
| 2009/0002178 A1* | 1/2009 | Guday | G06F 3/0346 340/573.1 |

(Continued)

OTHER PUBLICATIONS

A Mood-Based Music Classification and Exploration System by Owen Craigie Meyers, (Year: 2004).*

(Continued)

*Primary Examiner* — Mohammad K Islam
(74) *Attorney, Agent, or Firm* — Artegis Law Group, LLP

(57) ABSTRACT

Embodiments of the present disclosure set forth a computer-implemented technique for providing a personalized audio signal to a user. The technique includes determining a first mood of the user based on a first set of user parameters, selecting, based on the first mood of the user, a first acoustic profile. The first acoustic profile may include a first set of acoustic parameters, and causing an audio output device to reproduce a first input audio signal based on the first set of acoustic parameters.

15 Claims, 6 Drawing Sheets

(56) References Cited

U.S. PATENT DOCUMENTS

| | | | |
|---|---|---|---|
| 2009/0083448 A1* | 3/2009 | Craine | G06F 3/01 710/8 |
| 2010/0321519 A1* | 12/2010 | Bill | G06F 16/639 348/222.1 |
| 2010/0328088 A1* | 12/2010 | Lin | A61B 5/6807 340/666 |
| 2011/0239137 A1* | 9/2011 | Bill | G06F 16/637 715/757 |
| 2014/0142397 A1* | 5/2014 | Bedrosian | G06K 9/00302 600/301 |
| 2014/0142954 A1* | 5/2014 | Cameron | G06F 3/165 704/276 |
| 2014/0142967 A1* | 5/2014 | Bedrosian | G16H 10/20 705/2 |
| 2014/0172431 A1* | 6/2014 | Song | G06F 16/433 704/275 |
| 2014/0277649 A1 | 9/2014 | Chong et al. | |
| 2015/0235134 A1 | 8/2015 | Guan et al. | |
| 2015/0363164 A1* | 12/2015 | Caskey | G06F 16/61 340/4.4 |
| 2016/0048589 A1* | 2/2016 | Modi | G06Q 30/02 463/25 |
| 2016/0196105 A1 | 7/2016 | Vartakavi et al. | |
| 2016/0371050 A1 | 12/2016 | Tokunaga | |
| 2016/0371372 A1* | 12/2016 | Chong | G06F 16/686 |
| 2017/0003845 A1* | 1/2017 | Karsten | A61B 5/369 |
| 2017/0017462 A1* | 1/2017 | Kubiak | H03G 3/3089 |
| 2017/0115955 A1* | 4/2017 | Zalon | G06F 3/165 |
| 2017/0337742 A1* | 11/2017 | Powderly | G06F 3/04815 |
| 2018/0032610 A1* | 2/2018 | Cameron | G06F 40/284 |
| 2018/0032611 A1* | 2/2018 | Cameron | G06K 9/723 |
| 2018/0211660 A1* | 7/2018 | Bastide | A61M 21/02 |
| 2019/0142350 A1* | 5/2019 | Bastide | A61B 5/747 600/300 |
| 2019/0155840 A1* | 5/2019 | O'Konski | G06F 16/636 |
| 2019/0324710 A1* | 10/2019 | Klimanis | G06F 3/165 |
| 2020/0174734 A1* | 6/2020 | Gomes | G10L 25/84 |
| 2020/0245088 A1* | 7/2020 | Po | H04R 1/403 |

OTHER PUBLICATIONS

European Search Report for application No. 19150353.1 dated Apr. 30, 2019.

* cited by examiner

BIOMETRIC PERSONALIZED AUDIO PROCESSING SYSTEM

CROSS-REFERENCE TO RELATED APPLICATIONS

This application claims the priority benefit of the U.S. Provisional patent application titled, "Biometric Personalized Music Recommendation and Audio Processing System," filed on Jan. 4, 2018, and having Application No. 62/613,708. The subject matter of this related application is hereby incorporated herein by reference in its entirety.

BACKGROUND

Field of the Various Embodiments

Embodiments of the present disclosure relate generally to audio systems and, more specifically, to a biometric personalized audio processing system.

Description of the Related Art

Consumer audio systems, such as audio systems that are included in vehicles, homes, and/or consumer electric devices, enable users to enjoy various types of audio content. Certain audio systems are adjustable, enabling the user to change, based on the preferences of the user, the acoustic parameters of the audio system when the audio system reproduces an input audio signal.

In general, different users of an audio system typically prefer different acoustic parameters. For example, some users prefer that the audio system use acoustic parameters that provide an unmodified reproduction of the input audio signal, while other users may prefer that the audio system use a different set of acoustic parameters that significantly alter the reproduction of the input audio signal. To control how the audio system reproduces an input audio signal, a user may select certain acoustic parameters to control the frequency response of the audio system. For example, a user could select a set of bass-heavy acoustic parameters in order to adjust the frequency response of the audio system to emphasize low-frequency portions of the input audio signal. In another example, a user could select a set of spatialized acoustic parameters to cause the audio system to output an audio signal, such that the outputted sound emulates a particular type of environment and/or so that the outputted sound is perceived as originating from specific location(s) in the listening environment.

One drawback of such audio systems is that the user must manually select the acoustic parameters to be employed by the audio system. Alternatively, if the user does not adjust the acoustic parameters, then the user may have a degraded listening experience, since the default acoustic parameters may not result produce audio output that the user will enjoy. For example, a user may initially select a set of acoustic parameters that emphasizes low frequencies, for example, by selecting a +6 dB boost to the low-frequency range (e.g., a "bass boost"). However, if the user subsequently listens to a different input audio signal without readjusting the acoustic parameters, then the outputted sound may be distorted by the bass-boost acoustic parameters. Consequently, the user may have a degraded listening experience.

In light of the above, more effective techniques for automatically modifying the acoustic parameters of an audio system would be useful.

SUMMARY

Embodiments of the present disclosure set forth a computer-implemented method for providing a personalized audio signal to a user, the method comprising determining a first mood of the user based on a first set of user parameters, selecting, based on the first mood of the user, a first acoustic profile, wherein the first acoustic profile includes a first set of acoustic parameters, and causing an audio output device to reproduce a first input audio signal based on the first set of acoustic parameters.

Further embodiments provide, among other things, a method and computer-readable storage medium for implementing aspects of the methods set forth above.

At least one technological advantage of the disclosed techniques is that an audio system may dynamically control the acoustic parameters used when reproducing an input audio signal without requiring manual input by the user. Further, the disclosed techniques are able to determine the mood of a user and then select an acoustic profile that corresponds to the determined mood. Accordingly, the disclosed techniques enable the audio system to reproduce an input audio signal in a manner that is more likely to be enjoyed by the user, thereby enhancing the listening experience of the user.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
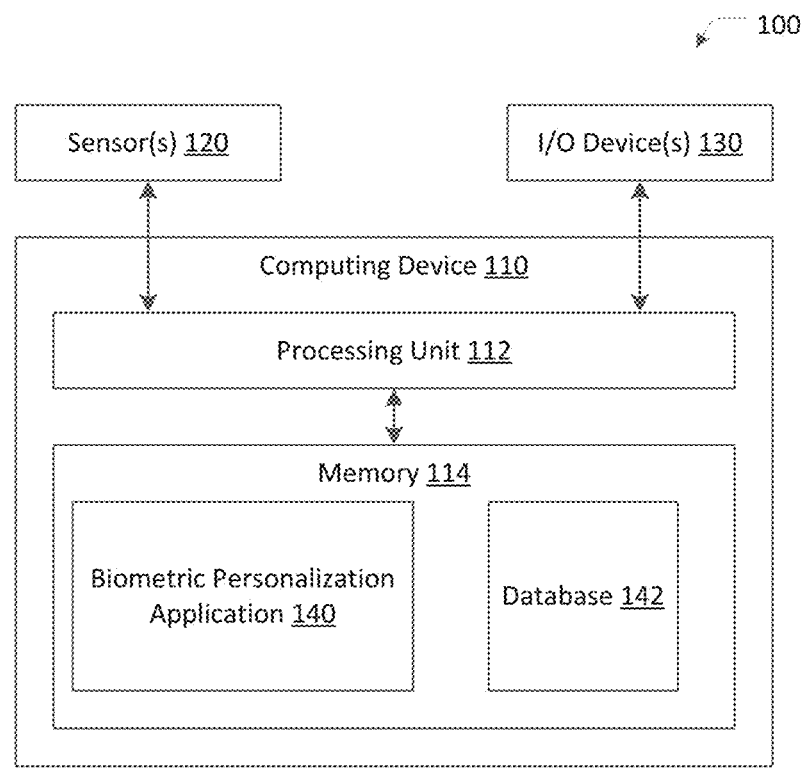
FIG. 1 illustrates a block diagram of a biometric personalization system configured to implement one or more aspects of the present disclosure.

FIG. 1 illustrates a block diagram of a biometric personalization system configured to implement one or more aspects of the present disclosure. Biometric personalization system 100 includes computing device 110, one or more sensor(s) 120, and one or more input/output (I/O) devices 130. Computing device 110 includes processing unit 112 and memory 114. Memory 114 stores biometric personalization application 140 and database 142.

In operation, processing unit 112 receives sensor data from sensor(s) 120. Processing unit 112 executes biometric personalization application 140 to receive one or more user parameters relating to a mood of a user. Upon receiving the one or more user parameters, biometric personalization application 140 then determines a mood of the user based on the one or more user parameters. For example, biometric personalization application 140 could select, from among a plurality of pre-defined moods, a specific pre-defined mood that corresponds to the one or more user parameters.

In some embodiments, the one or more user parameters may include one or more of sensor data, location data, activity data, and calendar data, and/or other data that reflect the mood of the user. In addition, biometric personalization application 140 could, for example, receive an audio track selected by the user and could determine characteristics of the audio track. Biometric personalization application 140 could then include the audio track characteristics as data relating to the mood of the user.

In some embodiments, biometric personalization application 140 may select a specific audio track based on the determined mood. Biometric personalization application 140 could then recommend the specific audio track to the user. If the user selects the specific audio track for playback, then biometric personalization application 140 could cause an audio output device to output the audio track.

Upon determining the mood of the user, biometric personalization application 140 may select, from among a plurality of pre-defined acoustic profiles, an acoustic profile that corresponds to the mood of the user. In various embodiments, an acoustic profile may include one or more acoustic parameters that specify how an audio output device reproduces an input audio signal. For example, an acoustic profile could include acoustic parameters that specify how one or more filters of the audio output device are to be tuned when reproducing the input audio signal. Once biometric personalization application 140 selects the corresponding acoustic profile, a dynamic equalizer (EQ) included in the audio output device employs the acoustic parameters included in the acoustic profile. For example, the dynamic EQ could include multiple filters. The operation of the filters included in the dynamic EQ could then be modified in the manner specified by the acoustic parameters when providing an output audio signal.

As noted above, computing device 110 can include processing unit 112 and memory 114. Computing device 110 can be a device that includes one or more processing units 112, such as a system-on-a-chip (SoC), or a mobile computing device, such as a tablet computer, mobile phone, media player, and so forth. Generally, computing device 110 can be configured to coordinate the overall operation of biometric personalization system 100. The embodiments disclosed herein contemplate any technically-feasible system configured to implement the functionality of biometric personalization system 100 via computing device 110.

Memory 114 can include a memory module or collection of memory modules. Biometric personalization application 140 within memory 114 can be executed by processing unit 112 to implement the overall functionality of the computing device 110 and, thus, to coordinate the operation of the biometric personalization system 100 as a whole.

Processing unit 112 may include a central processing unit (CPU), a digital signal processing unit (DSP), a microprocessor, an application-specific integrated circuit (ASIC), a neural processing unit (NPU), a graphics processing unit (GPU), a field-programmable gate array (FPGA), and so forth. In some embodiments, processing unit 112 can be configured to execute biometric personalization application 140 in order to analyze one or more user parameters relating to the mood of the user, determine the mood of the user based on the one or more user parameters, select an acoustic profile that corresponds to the determined mood, and causes an audio output device to employ one or more acoustic parameters included in the acoustic profile.

In various embodiments, processing unit 112 can execute biometric personalization application 140 to receive one or more user parameters related to the mood of the user. In some embodiments, biometric personalization application 140 can select one user parameter from among a plurality of user parameters and determine the mood of the user based only on the selected user parameter. In some embodiments, biometric personalization application 140 can determine the mood of the user based on a combination of two or more user parameters.

Biometric personalization application 140 may map the user parameters to one or more mood parameters that are included in a set of mood parameters. Then, for each user parameter, biometric personalization application 140 can determine one or more corresponding mood parameter values. Each mood parameter specifies a measurement of an emotion. For example, a set of mood parameters could include a quantitative value relating to the level of arousal (e.g., an arousal value between 0-10) and a quantitative value relating to the level of valence (e.g., a valence value between 0-10). Accordingly, biometric personalization application 140 may determine, based on a set of mood parameters, the mood of the user. In various embodiments, biometric personalization application 140 can select, from among a plurality of pre-defined moods, a specific mood that reflects the mood of the user. For example, biometric personalization application 140 could select a particular mood by comparing the set of mood parameters to mood parameters of a pre-defined mood.

In various embodiments, biometric personalization application 140 can recommend an audio track to the user. For example, biometric personalization application 140 could select a specific audio track to recommend based on the determined mood. In some embodiments, biometric personalization application 140 may determine audio track characteristics of one or more audio tracks and select a specific audio track with characteristics matching the determined mood.

Biometric personalization 140 may use the determined mood to select a pre-defined acoustic profile, where the pre-defined acoustic profile includes one or more acoustic parameters for an audio output device to employ when reproducing a given input audio signal. The acoustic profile includes one or more acoustic parameters that specify how an audio output device reproduces an input audio signal. For example biometric personalization application 140 could cause one or more filters included in the audio output device to modify the input audio signal as specified by the acoustic parameters. In such embodiments, when the audio output device receives an input audio signal, the audio output device reproduces the input audio signal in accordance with the acoustic parameters included in the selected acoustic profile.

Database 142 can store values and other data retrieved by processing unit 112 to coordinate the operation of biometric personalization application 100. During operation, processing unit 112 can be configured to store values in database 142 and/or retrieve values stored in database 142. For example, database 142 could store mood parameters, mappings of user parameters to mood parameters, pre-defined moods, predefined acoustic profiles, and so forth. In various embodiments, database 142 can include one or more lookup tables, where the lookup tables store entries that include mappings between values. For example, database 142 could include a mood parameter lookup table that includes entries of mappings of user parameters (e.g., biometric measurement values, keyword values, audio track characteristic values), to mood parameters (e.g., arousal values, valence values). Additionally or alternatively, database 142 can include a mood lookup table that maps mood parameters to pre-defined moods, and/or a lookup table that maps pre-defined moods to pre-defined acoustic profiles.

Sensor(s) 120 may include one or more devices that perform measurements and/or collect data related to certain subjects in an environment. In some embodiments, sensor(s) 120 can generate sensor data that is related to the mood of the user. For example, sensor(s) 120 could collect biometric data related to the user (e.g., heart rate, brain activity, skin conductance, blood oxygenation, pupil size, galvanic skin response, blood-pressure level, average blood glucose concentration, etc.). Additionally or alternatively, sensor(s) 120 can generate sensor data related to objects in the environment that are not the user. For example, sensor(s) 120 could generate sensor data about the operation of a vehicle, including the speed of the vehicle, ambient temperature in the vehicle, amount of light within the vehicle, and so forth. In some embodiments, the sensor(s) 120 may be coupled to and/or included within computing device 110 and send sensor data to processing unit 112. Processing unit 112 executes biometric personalization application 140 to determine the mood of the user based on the received sensor data.

In various embodiments, the one or more sensors 120 can include optical sensors, such RGB cameras, time-of-flight sensors, infrared (IR) cameras, depth cameras, and/or a quick response (QR) code tracking system. In some embodiments, the one or sensors 120 can include position sensors, such as an accelerometer and/or an inertial measurement unit (IMU). The IMU can be a device like a three-axis accelerometer, gyroscopic sensor, and/or magnetometer. In addition, in some embodiments, the one or more sensors 120 can include audio sensors, wireless sensors, including radio frequency (RF) sensors (e.g., sonar and radar), ultrasound-based sensors, capacitive sensors, laser-based sensors, and/or wireless communications protocols, including Bluetooth, Bluetooth low energy (BLE), wireless local area network (WiFi) cellular protocols, and/or near-field communications (NFC).

I/O device(s) 130 may include devices capable of receiving input, such as a keyboard, a mouse, a touch-sensitive screen, a microphone and so forth, as well as devices capable of providing output, such as a display screen, loudspeakers, and the like. One or more of I/O devices 130 can be incorporated in computing device 110, or may be external to computing device 110. In various embodiments, I/O device(s) 130 includes an audio output device that outputs audio signal while employing one or more acoustic parameters provided by biometric personalization application 140.

Figure 2:
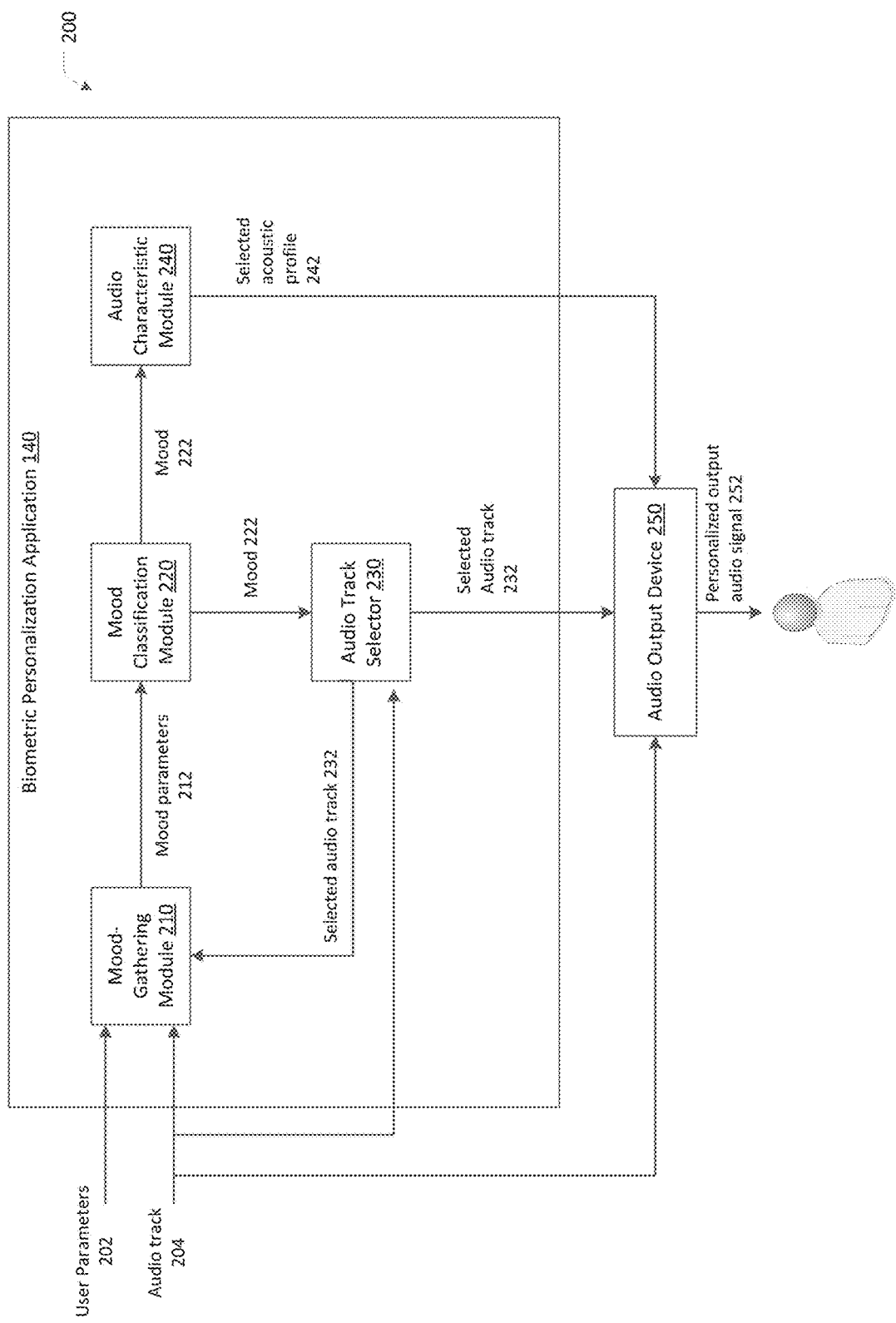
FIG. 2 illustrates a block diagram for producing a personalized output audio signal using the biometric personalization system of FIG. 1, according to various embodiments of the present disclosure.

FIG. 2 illustrates a block diagram for producing a personalized output audio signal using the biometric personalization system of FIG. 1, according to various embodiments of the present disclosure. As shown, biometric personalization system 200 includes biometric personalization application 140 and audio output device 250. Biometric personalization application 140 includes mood-gathering module 210, mood classification module 220, audio track selector 230, and audio characteristic module 240.

During operation, mood-gathering module 210 receives user parameters 202 that relate to the mood of the user. In some embodiments, mood-gathering module 210 can also receive audio track 204 that is selected by the user, selected audio track 232 that is determined by audio track selector 230. In such instances, mood-gathering module 210 can analyze the received audio track 204, 232 and, based on the analysis, associate a set of mood parameters 212 and/or a mood 222 with the received audio track. For example, mood-gathering module 210 could execute one or more machine learning techniques to estimate the audio track characteristics of the audio track 204, 232. Upon determining the audio track characteristics, mood-gathering module 210 could classify the determined audio track characteristics as relating to a particular mood of the user. In such instances, mood-gathering module 210 could include the audio track characteristics in the set of user parameters 202.

Mood-gathering module 210 maps the user parameters 202 to a set of mood parameters 212. For example, mood-gathering module 210 could map a given user parameter to one or more mood parameter values. Upon mapping each of the user parameters 202 to one or more mood parameter values, mood-gathering module 210 could then select a specific set of mood parameters 212 and provide the set of mood parameters 212 to mood classification module 220. Additionally or alternatively, mood-gathering module 210 can combine two or more mood parameter values in order to generate a set of composite mood parameters 212 to provide to mood classification module 220.

Mood classification module 220 receives mood parameters 212 provided by mood-gathering module 210 and classifies the mood parameters 212 as corresponding to a specific pre-defined mood 222. In some embodiments, each pre-defined mood 222 may include specified ranges of mood parameter values. For example, a pre-defined mood 222 (e.g., calm) could be defined by a one or more ranges for mood parameter values, such as a range arousal values below 5, and/or a valence values above 6. Mood classification module 220 could compare mood parameters 212 to the ranges of mood parameter values a pre-defined mood 222 to determine whether mood parameters 212 are within the range of predefined mood 222. For example, when mood classification module receives mood parameters 212 that includes a valence value of 7 and an arousal value of 2, mood classification module 220 could determine that the set of mood parameters is within the range of a pre-defined mood 222 (e.g., calm).

In some embodiments, each of the pre-defined moods 222 is stored in database 142. In some embodiments, mood classification module 220 refers to a lookup table to find an entry matching the values for mood parameters 212 and determines a corresponding pre-defined mood 222 included in the entry. Additionally or alternatively, upon classifying the set of mood parameters 212, mood classification module 220 provides the corresponding pre-defined mood 222 to audio track selector 230 and/or audio classification module 240.

Audio track selector 230 receives a specified mood 222 provided by mood classification module 220 and may provide a selected audio track 222 that corresponds to the mood 222. In some embodiments, biometric personalization application 140 can store audio track characteristics of a plurality of audio tracks 204. In addition, biometric personalization application 140 can store corresponding sets of mood parameters 212 for the plurality of audio tracks 204, and/or the corresponding pre-defined mood 222 for the plurality of audio tracks 204. In such instances, audio track selector 230 can retrieve one or more audio tracks 204 that have characteristics that match mood 222 and choose one of the matching audio tracks 204 as selected audio track 232. In some embodiments, audio track selector 230 can automatically cause audio output device 250 to play selected audio track 232. Alternatively, in some embodiments, audio track selector 230 can generate a recommendation for selected audio track 232 and provide the recommendation to the user. In such instances, biometric personalization application 140 may wait for the user to select the recommendation before causing audio output device 250 to play selected audio track 232.

Additionally or alternatively, audio track selector 230 can provide selected audio track 232 to mood-gathering module 210. For example, audio track selector 230 could provide selected audio track 232 to mood-gathering module 210 to provide additional data relating to the mood of the user. In such instances, mood-gathering module 210 can use the audio track characteristics of selected audio track 232 to determine corresponding mood parameters 212.

Audio characteristic module 240 receives the pre-defined mood 222 provided by mood classification module 220 and selects a pre-defined acoustic profile that corresponds to the pre-defined mood 222. Each pre-defined acoustic profile includes a set of one or more acoustic parameters that control how audio output device 250 reproduces a given input signal. For example, a pre-defined acoustic profile could include a group of acoustic parameters (e.g., audio parameters that specify, for a given filter, a center frequency, frequency range, gain, Q factor, etc.) that specify the acoustic filter response of the audio output device 250. When selecting a pre-defined acoustic profile, in some embodiments, audio characteristic module 240 can use mood 222 to retrieve a specific pre-defined acoustic profile. Additionally or alternatively, audio characteristic module 240 can refer to a lookup table that includes entries that map each pre-defined mood 222 to a corresponding acoustic profile, which audio characteristic module 240 retrieves as selected acoustic profile 242. Upon identifying and retrieving selected acoustic profile 242, audio characteristic module 240 can provide selected acoustic profile 242 to audio output device 250.

Audio output device 250 employs one or more of the acoustic parameters included in the selected acoustic profile 242 when reproducing an input audio signal. In various embodiments, audio output device 250 receives an indication associated with selected acoustic profile 242 and modifies the operating parameters of one or more filters included in audio output device 250. The filters operate in a manner that adheres to the specifications of the acoustic parameters. Upon modifying the one or more filters, audio output device 250 reproduces an input audio signal to provide a personalized output audio signal 252 to the user. In various embodiments, audio output device 250 may directly receive audio track 204 and/or selected track 232. In such instances, audio output device 250 can use an included digital-to-analog converter to generate an analog signal from a filtered version of the received audio track 204, 232.

For example, selected acoustic profile 242 could include a set of acoustic parameters that specify parameters for a low-range filter. When audio output device 250 receives an indication to that selected acoustic profile 242 is to be employed, the operating parameters of the low-frequency range filter are modified so that the low-frequency range filter operates in a manner that matches the specifications included in selected audio profile 242. Audio output device 250 could then receive audio track 204. Audio output device 250 could then filter audio track 204 low-frequency range filter and provide personalized output audio signal 252 based on the filtered version of audio track 204.

Figure 3:
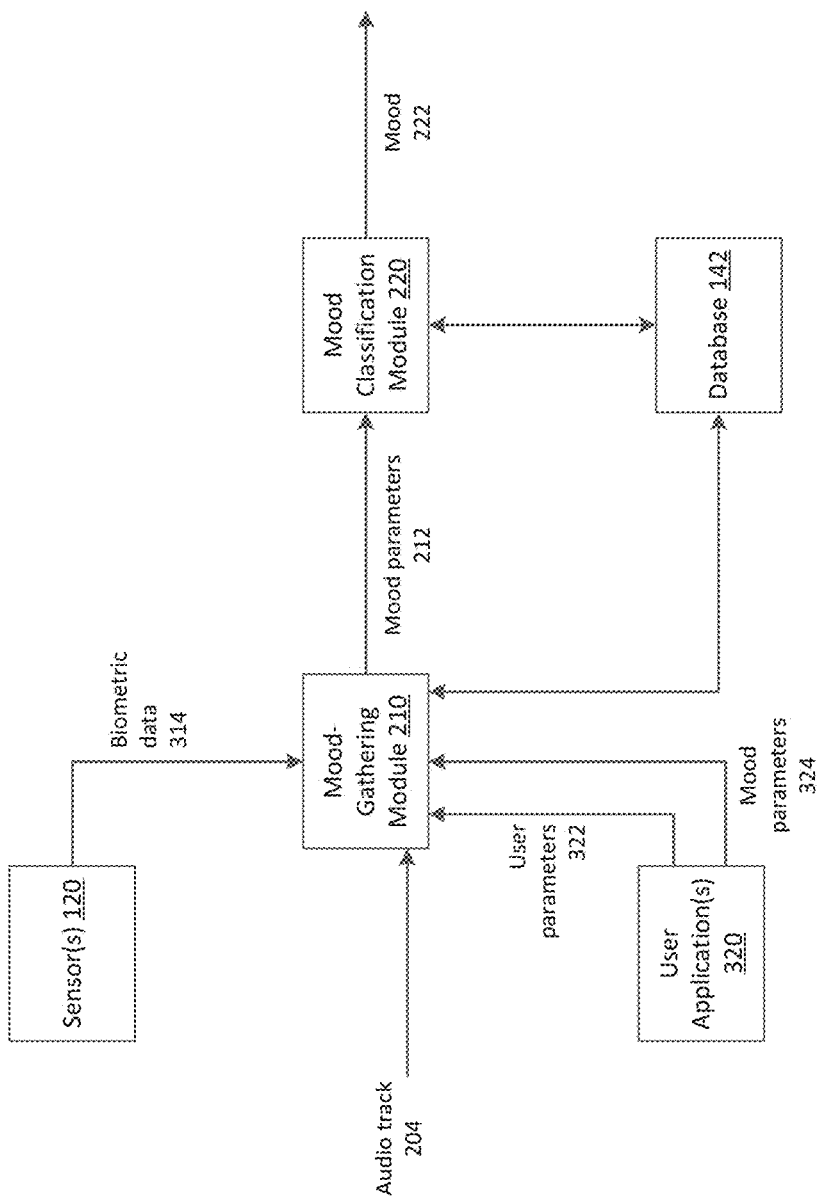
FIG. 3 illustrates a technique for receiving user parameters relating to the mood of a user using the biometric personalization system of FIG. 1, according to various embodiment of the present disclosure.

FIG. 3 illustrates a technique for receiving user parameters relating to the mood of a user using the biometric personalization system of FIG. 1, according to various embodiment of the present disclosure. As shown, biometric personalization system 300 includes sensor(s) 120, database 142, mood-gathering module 210, and mood classification module 220.

In operation, mood-gathering module 210 receives one or more inputs. Mood-gathering module 210 includes one or more of the inputs in a set of user parameters 202. In various embodiments, the inputs include at least one of an audio track 204, biometric data 314, secondary user parameters 322, and/or secondary mood parameters 324. Mood-gathering module 310 incorporates the one or more inputs into a set of user parameters 202 and determines, for each user parameter included in the set of user parameters 202, a corresponding set of mood parameters 212.

In various embodiments, sensor(s) 120 can provide biometric data 314 that reflect the mood of the user. In some embodiments, biometric data 314 can include specific measurements relating to the user. For example, mood-gathering module 210 could receive biometric data 314 that includes measurements of the user's current levels of serotonin, noradrenaline, and/or dopamine, respectively. In such instances, mood-gathering module 120 can process the received biometric data 314 to generate mood parameters 212. In another example, mood-gathering module 210 can receive biometric data 314 that includes a measurement of the user's current heartbeat (e.g., 80 bpm). Biometric data 314 can map the heartbeat measurement to a specific mood parameter values (e.g., a valence value of 5 and an arousal value of 6) and generate the set of mood parameters 212 including those values.

In various embodiments, user application(s) 320 can provide one or more secondary user parameters 322 and/or secondary mood parameters 324 to mood-gathering module 210. User application(s) 320 can be one or more applications that communicate with biometric personalization application 140, and provide data related to the mood of the user. For example, user application 320 could prompt the user to enter a current mood or a target mood. The user could manually enter the current mood or the target mood. User application 320 could then send a set of secondary mood parameters 324 based on the user's input.

In some embodiments, user application(s) 320 provides secondary user parameters 322, which includes one or more data sets that mood-gathering module 320 maps to a set of mood parameters 212. For example, a scheduling application could provide one or more calendar appointments as secondary user parameters 322. Mood-gathering module 210 could analyze the contents of the calendar appointment (e.g., search for specific keywords, such as exercise, lunch, happy hour, etc.), and then map the calendar appointment to one or more mood parameter values. In some embodiments, user application(s) 320 can provide other types of user parameters 322, including, but not limited to, task data (e.g., number of pending tasks to complete), location data (e.g., GPS, position/heading, etc.), historical data, activity data, or any other technically-feasible data set that can be associated with the mood of the user. In various embodiments, mood-gathering module 210 can map the data included in secondary user parameters 322 to a set of mood parameters 212.

In some embodiments, mood-gathering module 210 can analyze user parameters 202 and can determine separate sets of mood parameters 212, including at least a first set of mood parameters 212 relating to the current mood of the user and a second set of mood parameters relating to a target mood for the user. For example, mood-gathering module 210 could receive user parameters 202 that could include biometric data 314 indicating that the user has not been active recently. User parameters 202 could also include a calendar appointment for an exercise session and location/position data indicating that the user is heading towards a gym. Mood-gathering module 210 can analyze user parameters 202 and determine that the user's current mood is calm (e.g., making the determination based on the biometric data 314) and the user's target mood is angry (e.g., making the determination based on the calendar appointment and location/position data). In such instances, mood-gathering module 210 could send separate sets of mood parameters 212. Upon receiving the separate sets of mood parameters 212, mood classification module 220 could determine separate moods 222, including a first mood 222 indicating the current mood, and a second mood 222 indicating the target mood.

Mood-gathering module 210 generates one or more mood parameters 212 that correspond to at least one user parameter. Mood parameters 212 include one or more values that relate to the mood of the user. For example, a set of mood parameters 212 could include a quantitative value relating to a level of arousal (e.g., an arousal value between 0-10) and a quantitative value relating to a level of valence (e.g., a valence value between 0-10). In some embodiments, mood-gathering module 210 generates mood parameters 212 as a coordinate set that includes the valence and arousal values. For example, mood-gathering module 210 can generate mood parameters 212 that include a valence value of 2 and an arousal level of 3 as a coordinate pair (2, 3). Additionally or alternatively, mood-gathering module 210 can generate mood parameters 212 using one or more other values. For example, mood-gathering module 210 can generate a set of mood parameters that include one or more values corresponding to concentrations neurotransmitters, including serotonin, noradrenaline, and dopamine as (6, 40, 4). Additionally or alternatively, mood-gathering module 210 can include other quantitative and/or qualitative mood parameter values into a set of mood parameters 212.

In various embodiments, mood-gathering module 210 can retrieve a previously-stored mapping of a given user parameter to one or more mood parameter values. In such instances, mood-gathering module 210 can refer to a mood parameter lookup table stored in database 142 to find an entry matching the given user parameter and retrieve the corresponding mood parameters values included in the matching entry. Additionally or alternatively, mood-gathering module 210 can apply one or more machine learning techniques to generate new mapping(s) of a given user parameter to mood parameter values, and then store the new mapping(s) as an entry in the mood parameter lookup table.

Mood classification module 220 receives mood parameters 212 and determines a mood based on mood parameters 212. Mood classification module 220 analyzes mood parameters 212 and classifies mood parameters 212 as being included within one specific mood, where the specific mood is one of a plurality of pre-defined moods 222. In various embodiments, biometric personalization application 140 stores one or more pre-defined moods 222. Each of the one or more pre-defined moods 222 encompasses a range of mood parameter values. For example, a pre-defined mood 222 can include a range of valence values below 5 and arousal values above 5. When mood-gathering module 210 provides mood parameters 212 as a coordinate pair (6, 8), Mood classification module 220 can determine that mood parameters 212 are within the range of pre-defined mood 222.

In various embodiments, mood classification module 220 can retrieve a previously-stored mapping of mood parameters 212 to a pre-defined mood 222. In such instances, mood classification module 220 can refer to a mood lookup table stored in database 142 to find an entry matching mood parameters 212, and then retrieve the corresponding pre-defined mood 222 specified in the matching entry. Additionally or alternatively, mood-gathering module 210 can retrieve a data associated with one or more pre-defined moods and compare the set of mood parameters with the retrieved data, selecting one of the one or more pre-defined moods as mood 222.

Figure 4:
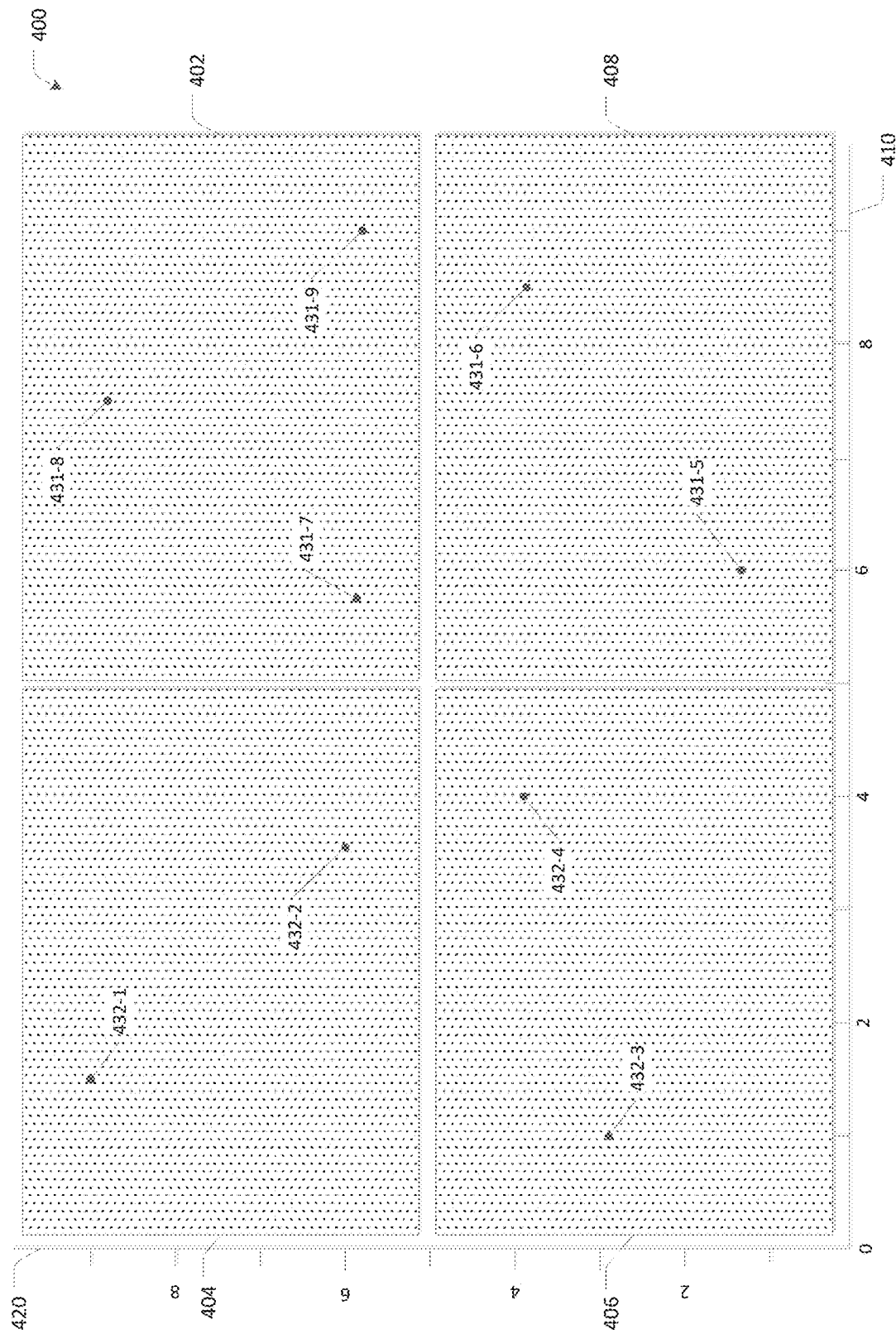
FIG. 4 illustrates a graph that may be implemented by the biometric personalization system of FIG. 1 to determine the mood of the user, according to various embodiments of the present disclosure.

FIG. 4 illustrates a graph that may be implemented by the biometric personalization system of FIG. 1 to determine the mood of the user, according to various embodiments of the present disclosure. As shown, graph 400 shows a coordinate plot for valence values 410 along the x-axis and arousal values 420 along the y-axis. The graph includes ranges for pre-defined moods 402-408 and coordinates 432 (e.g., 431-1 to 431-9) for multiple sets of mood parameters 212.

In operation, mood classification module 220 can classify a set of mood parameters 212 by comparing mood parameters 212 with properties of one or more pre-defined moods 222. Graph 400 illustrates four pre-defined moods 222, including a first mood (e.g., "happy") 402, a second mood (e.g., "angry") 404, a third mood (e.g., "sad") 406, and a fourth mood (e.g., "calm") 408. In various embodiments, biometric personalization module 140 can store varying numbers of pre-defined moods 222. Additionally or alternatively, biometric personalization module 140 can associate a given pre-defined mood 222 with different ranges of mood parameter values (e.g., arousal, valence, pleasure, dominance, serotonin, noradrenaline, acetylcholine, and/or dopamine, etc.).

In some embodiments, mood classification module 220 may receive mood parameters 212 as a set of coordinates 432. For example, mood classification module 220 could receive mood parameters 212 as coordinates 432-1. Because the value of coordinates 432-1 is (1.5, 9), mood classification module 220 could compare coordinates 432-1 to one or more of pre-defined moods 402-408 and could determine that the coordinates 432-1 are within the range of second mood 404. Based on this determination, mood classification module 220 could determine that the corresponding pre-defined mood 222 for the received set of mood parameters 212 is second mood 404. Mood classification module 220 could then provide the second mood 404 as selected mood 222 to audio track selector 230 and/or audio classification module 240.

Figure 5:
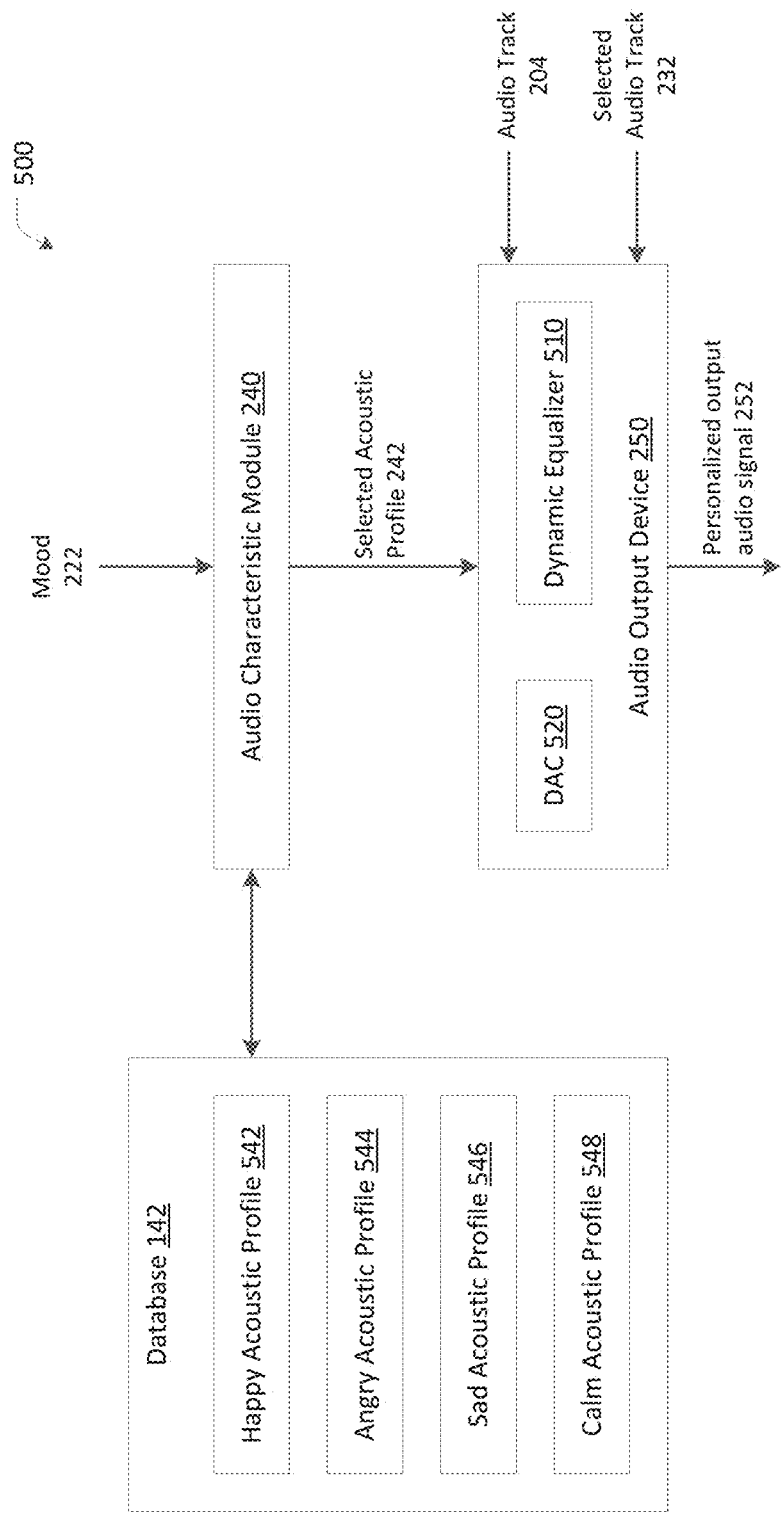
FIG. 5 illustrates a technique for providing a personalized output audio signal using the biometric personalization system of FIG. 1, according to various embodiments of the present disclosure.

FIG. 5 illustrates a technique for providing a personalized output audio signal using the biometric personalization system of FIG. 1, according to various embodiments of the present disclosure. As shown, biometric personalization system 500 includes database 142, audio characteristic module 240, and audio output device 250. Database 142 stores multiple acoustic profiles 542-548. Audio output device 250 includes a dynamic equalizer 510 and a digital-to-analog converter (DAC) 520.

In operation, audio characteristic module 240 receives a mood 222 provided by mood classification module 220. Audio characteristic module 240 uses the received mood 222 to select a specific acoustic profile from among the plurality of acoustic profiles 542-548 stored in database 142. Audio characteristic module 240 indicates to audio output device 250 that selected acoustic profile 242 is to be employed. Audio output device 250 responds to the indication of selected acoustic profile 242 by modifying dynamic equalizer 510 to operate in a manner specified by selected acoustic profile 242. When audio output device 250 receives an audio track 204, dynamic equalizer 510 filters the audio track 204. DAC 520 converts the filtered audio track 204. Audio output device then produces personalized output audio signal 252 based on the filtered audio track.

Acoustic profiles 542-548 are pre-defined acoustic profiles that each includes sets of one or more acoustic parameters. As shown, the group of pre-defined acoustic profiles 542-548 includes happy acoustic profile 542, angry acoustic profile 544, sad acoustic profile 546, and calm acoustic profile 548. In operation, audio output device 250 alters its frequency response in a manner that adheres to the one or more acoustic parameters included in a given acoustic profile. In some embodiments, biometric personalization application 140 may continually retrieve one pre-defined acoustic profiles 542-548 in order to dynamically modify the operation of dynamic equalizer 510.

The acoustic parameters included in one of the pre-defined acoustic profiles 542-548 specify to be employed by certain operating parameters (e.g., audio parameters that specify, for a given filter, a center frequency, frequency range, gain, Q factor, etc.) to be employed by of one or more filters included in dynamic equalizer 510. For example, angry acoustic profile 544 includes a set of acoustic parameters (e.g., Table I) that specify the operating parameters for three separate parametric filters. Such acoustic parameters include, for example, a center frequency, frequency range (i.e., the frequency range a filter modifies), gain (i.e., the increase or decrease in power for a given step), Q factor (i.e., ratio of the bandwidth of the filter compared to the center frequency), and/or the type of filter (e.g., selection of a filter as a peak filter, shelf filter. notch filter, etc.).

TABLE I

Acoustic parameters included in an exemplary angry acoustic profile

| Bass Filter Parameters | | Midrange Filter Parameters | | Treble Filter Parameters | |
|---|---|---|---|---|---|
| Center Freq. | 50 Hz | Center Freq. | 400 Hz | Center Freq. | 6 kHz |
| Type | Peak/Notch | Type | Peak/Notch | Type | Peak/Notch |
| Q | 0.707 | Q | 0.5 | Q | 0.5 |
| Adjustment Range: | | Adjustment Range: | | Adjustment Range: | |
| Step | Level (dB) | Step | Level (dB) | Step | Level (dB) |
| +10 | +5.0 | +10 | +5.0 | +10 | +10.0 |
| +9 | +4.5 | +9 | +4.5 | +9 | +9.0 |
| +8 | +4.0 | +8 | +4.0 | +8 | +8.0 |
| +7 | +3.5 | +7 | +3.5 | +7 | +7.0 |

TABLE I-continued

Acoustic parameters included in an exemplary angry acoustic profile

| +6 | +3.0 | +6 | +3.0 | +6 | +6.0 |
|---|---|---|---|---|---|
| +5 | +2.5 | +5 | +2.5 | +5 | +5.0 |
| +4 | +2.0 | +4 | +2.0 | +4 | +4.0 |
| +3 | +1.5 | +3 | +1.5 | +3 | +3.0 |
| +2 | +1.0 | +2 | +1.0 | +2 | +2.0 |
| +1 | +0.5 | +1 | +0.5 | +1 | +1.0 |
| 0 | 0.0 | 0 | 0.0 | 0 | 0.0 |
| −1 | −1.0 | −1 | −1.0 | −1 | −1.0 |
| −2 | −2.0 | −2 | −2.0 | −2 | −2.0 |
| −3 | −3.0 | −3 | −3.0 | −3 | −3.0 |
| −4 | −4.0 | −4 | −4.0 | −4 | −3.5 |
| −5 | −5.0 | −5 | −5.0 | −5 | −4.0 |
| −6 | −6.0 | −6 | −6.0 | −6 | −5.0 |
| −7 | −7.0 | −7 | −7.0 | −7 | −6.0 |
| −8 | −8.0 | −8 | −8.0 | −8 | −7.0 |
| −9 | −9.0 | −9 | −9.0 | −9 | −7.5 |
| −10 | −10.0 | −10 | −10.0 | −10 | −8.0 |

In some embodiments, the acoustic parameters can include spatialization parameters. Spatialization parameters could specify, for example, a point source origin of a sound, as perceived by the user. Such spatialization parameters include, for example, the distance between the speaker and the user, dimensions of the environment, etc. When selected acoustic profile 242 includes one or more spatialization parameters, audio output device 250 could modify dynamic EQ 510 such that one or more portions of personalized output audio signal 252 sound as if originating from a specific point source.

Audio characteristic module 240 receives pre-defined mood 222 and selects a specific acoustic profile from among a plurality of pre-defined acoustic profiles 542-548. In some embodiments, audio characteristic module 240 can refer to an acoustic profile lookup table (e.g., Table II) included in database 142. The acoustic profile lookup table includes entries that map a given pre-defined mood 222 to one of the pre-defined acoustic profiles 542-548. For example, database 142 could include an acoustic profile lookup table that maps pre-defined moods 402-408 to pre-defined acoustic profiles 542-548.

TABLE II

An exemplary acoustic profile lookup table

| Mood | Acoustic Profile |
|---|---|
| Mood 402 | Happy Acoustic Profile 542 |
| Mood 404 | Angry Acoustic Profile 544 |
| Mood 406 | Sad Acoustic Profile 546 |
| Mood 408 | Calm Acoustic Profile 548 |

Upon retrieving the matching entry from the acoustic profile lookup table, audio characteristic module 240 can retrieve the matching acoustic profile from database 142. Upon retrieving the acoustic profile, audio characteristic module 240 can provide the retrieved acoustic profile as selected acoustic profile 242.

Audio output device 250 employs one or more of the acoustic parameters included in selected acoustic profile 242 when outputting personalized output 252. In various embodiments, audio output device 250 can receive an indication that selected acoustic profile 242 is to be employed. Audio output device 250 modifies the operating parameters of one or more filters included in dynamic equalizer 510. Modifying dynamic equalizer 510 modifies the frequency response of audio output device 250. When audio output device 250 subsequently filters audio track 204, 232 the modified frequency response of audio output device 250 provides personalized output audio signal 252 based on the filtered audio track.

For example, audio output device 250 could receive an indication that angry acoustic profile 544 is the selected acoustic profile 242. Angry acoustic profile 544 could include acoustic parameters for three separate parametric filters. Audio output device 250 could respond to the indication by modifying one or more operating parameters (e.g., center frequency, gain, Q factor, etc.) of the three parametric filters in order to have the filters to operate in the manner specified by the acoustic parameters. Audio output device 250 then has a modified frequency response based on the modified filters and provides personalized output audio signal 252 based on a filtered audio track that was filtered by the modified frequency response.

In various embodiments, audio output device 250 can include DAC 520 that converts the filtered audio track into an analog signal. Audio output device 250 provides personalized output audio signal 252 based on the analog signal generated by DAC 520. Audio output device 250 uses one or more amplifiers and/or one or more speakers to produce sound output that corresponds to personalized output audio signal 252.

Figure 6:
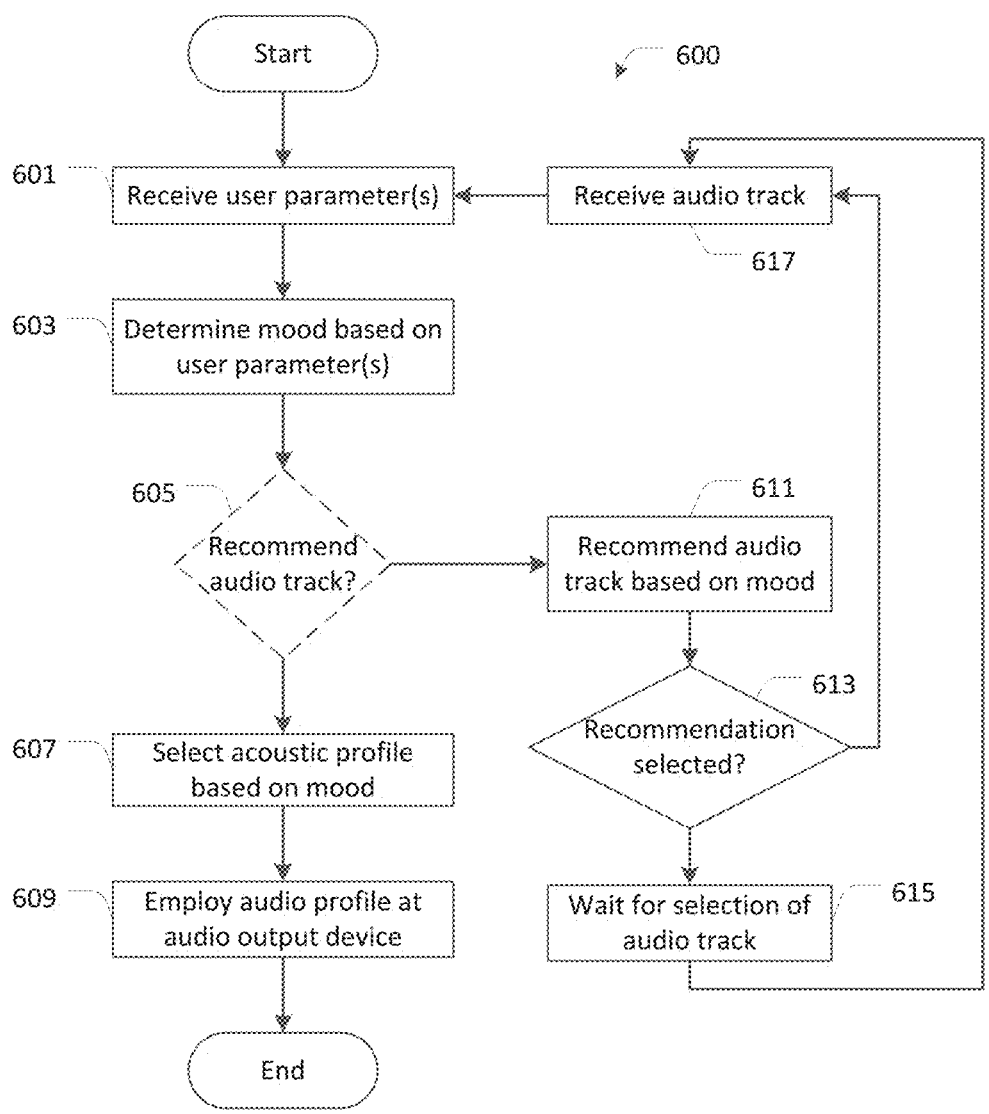
FIG. 6 is a flow diagram of method steps for providing a personalized audio output, according to various embodiments of the present disclosure.

FIG. 6 is a flow diagram of method steps for providing a personalized audio output, according to various embodiments of the present disclosure. Although the method steps are described with respect to the systems of FIGS. 1-5, persons skilled in the art will understand that any system configured to perform the method steps, in any order, falls within the scope of the various embodiments.

As shown, method 600 begins at step 601, where a mood gathering module 210 included in biometric personalization application 140 receives user parameters 202 associated with the user's mood. In some embodiments, user parameters 202 may include biometric data 314 associated with the user. Additionally or alternatively, mood-gathering module 210 may receive secondary user parameters 322 and/or secondary mood parameters 324 from one or more user applications 320. In some embodiments, mood-gathering module 210 may receive an audio track 204, 232 and may determine one or more audio track characteristics for the audio track 204.

At step 603, biometric personalization application 140 determines a user's mood based on user parameters 202. In various embodiments, mood-gathering module 210 may first determine, for the one or more user parameters included in user parameters 202, one or more mood parameter values. In some embodiments, mood-gathering module 210 may retrieve one or more entries in a mood parameter lookup table stored in database 142 that match a given user parameter in order to identify applicable mood parameter value(s). Based on the mood parameter values, mood classification module 220 can map the one or more mood parameter values to a pre-defined mood 222.

At step 605, biometric personalization application 140 can optionally determine whether to recommend an audio track. In various embodiments, audio track selector 230 can recommend an audio track with characteristics that match the pre-defined mood 222 provided by mood classification module 220. When biometric personalization application 140 determines to provide a recommendation, biometric personalization application 140 proceeds to step 611; otherwise, biometric personalization application 140 proceeds to step 607.

At step 607, biometric personalization application 140 selects an acoustic profile based on the mood of the user. Audio characteristic module 240 included in biometric personalization application 140 receives pre-defined mood 222 from mood classification module 220 and selects a corresponding acoustic profile from a plurality of predefined acoustic profiles 542-548 stored in database 142. In some embodiments, audio characteristic module 240 can refer to an acoustic profile lookup table to find an entry that specifies a pre-defined acoustic profile that corresponds to mood 222. At step 609, audio output device 250 employs the acoustic parameters included in the selected acoustic profile 242. Biometric personalization application 140 causes audio output device 250 to employ the acoustic parameters specified in the selected acoustic profile 242 when audio output device 250.

Returning to step 605, upon determining that biometric personalization application 140 is to provide a recommendation, at step 611, biometric personalization application 140 provides a recommendation for selected audio track 232 to the user. In various embodiments, audio track selector 230 included in mood personalization application 140 can select an audio track to recommend to the user. Audio track selector 230 recommends selected audio track 232 based on the pre-defined mood 222. For example, audio track selector 230 could receive mood 222 from mood classification module 220 and could recommend a selected audio track 232 that has audio track characteristics (e.g., tempo, pitch, loudness, etc.) that correspond to pre-defined mood 222.

At step 613, biometric personalization application 140 determines whether the user selected the recommendation. When biometric personalization application 140 determines that user selected the recommendation (e.g., receiving an indication), biometric personalization application 140 proceeds to step 517, where biometric personalization application 140 retrieves the selected audio track 232. Otherwise, biometric personalization application 140 proceeds to step 615, where biometric personalization application 140 waits for the user to select an audio track to play.

At step 615, biometric personalization application 140 waits for the user to select an audio track 204 to play. In various embodiments, biometric personalization application 140 waits to receive an audio track 204, as specified by the user, to play. Biometric personalization application 140 causes audio output device 250 to play an input audio signal corresponding to the audio track 204. In some embodiments, biometric personalization application 140 may first receive audio track 204 and determine the pre-defined mood 222 of the user based on the characteristics of the audio track 204.

At step 617, biometric personalization application 140 receives the audio track. In various embodiments, biometric personalization application 140 receives an indication from the user to play selected audio track 232. In some embodiments, biometric personalization application 140 receives audio track 204, manually selected by the user. Biometric personalization application 140 determines an acoustic profile 542-548 for audio output device 250 and causes audio output device 250 to produce personalized output audio signal 252 based on the received audio track 204, 232.

In sum, a biometric personalization application receives one or more user parameters relating to a mood of a user. For example, the biometric personalization application could receive biometric data, sensor data, location/position data, and/or calendar data that reflect the mood of the user. The biometric personalization application determines a mood for the user based on the one or more user parameters. For example, the biometric personalization application could determine mood parameters corresponding to the one or more user parameters and, based on the mood parameters, determine a pre-defined mood of the user. In some embodiments, the biometric personalization application can recommend an audio track to play, where the recommended audio track corresponds to the determined mood.

Based on the determined mood, the biometric personalization application selects an acoustic profile that corresponds to the determined mood. The acoustic profile includes one or more acoustic parameters that specify how an audio output device reproduces an input audio signal. For example, an acoustic profile includes acoustic parameters that specify how the operating parameters of one or more filters included within the audio output device are to be modified. A dynamic equalizer included in the audio output device is modified to adhere to the specification of the acoustic parameters included in the acoustic profile. When the audio output device receives an input audio signal, the audio output device produces an output audio signal while employing the acoustic parameters included in the selected acoustic profile.

At least one technological advantage of the disclosed techniques is that an audio system may dynamically control the acoustic parameters used when reproducing an input audio signal without requiring manual input by the user. Further, the disclosed techniques are able to determine the mood of a user and then select an acoustic profile that corresponds to the determined mood. Accordingly, the disclosed techniques enable the audio system to reproduce an input audio signal in a manner that is more likely to be enjoyed by the user, thereby enhancing the listening experience of the user.

1. In some embodiments, a computer-implemented method for providing a personalized audio signal to a user comprises determining a first mood of the user based on a first set of user parameters, selecting, based on the first mood of the user, a first acoustic profile, wherein the first acoustic profile includes a first set of acoustic parameters, and causing an audio output device to reproduce a first input audio signal based on the first set of acoustic parameters.

2. The computer-implemented of method of clause 1, further comprising receiving a first audio track, and generating a first set of values reflecting acoustic characteristics of the first audio track, wherein the first set of values is included in the first set of user parameters.

3. The computer-implemented method of clause 1 or 2, further comprising after causing the audio output device to reproduce the first audio signal, determining a second mood of the user based on a second set of user parameters, wherein the second mood is different than the first mood, selecting, based on the second mood of the user, a second acoustic profile, wherein the second acoustic profile includes a second set of acoustic parameters, and causing the audio output device to reproduce a second audio signal based on the second set of acoustic parameters.

4. The computer-implemented method of any of clauses 1-3, where the first set of user parameters includes sensor data provided by at least one sensor, the sensor data indicating at least one of a position of the user, a location of the user, a temperature, a noise level surrounding the user, and an amount of light surrounding the user.

5. The computer-implemented method of any of clauses 1-4, where the first set of user parameters includes biometric data associated with the user, the biometric data including at least one of a heart rate, a pupil size, a galvanic skin response, a blood pressure level, and an average blood glucose concentration.

6. The computer-implemented method of any of clauses 1-5, where the first set of user parameters includes a first set of user data received from a second application, wherein the first set of user data corresponds to a pre-defined mood.

7. The computer-implemented method of any of clauses 1-6, where determining the first mood of the user comprises determining, based on the first set of user parameters, a first set of mood parameters, wherein the set of first mood parameters includes an arousal value and a valence value, and determining the first mood of the user based on the first set of mood parameters.

8. The computer-implemented method of any of clauses 1-7, further comprising determining, based on a second set of user parameters, a target mood of the user, wherein the target mood is different than the first mood of the user, determining, based on the target mood of the user, a second acoustic profile, wherein the second acoustic profile includes a second set of acoustic parameters, and causing the audio output device to reproduce the second audio signal based on the second set of acoustic parameters instead of the first set of acoustic parameters.

9. The computer-implemented method of any of clauses 1-8, further comprising generating a first set of values reflecting the acoustic characteristics of a first audio track, associating, based on the first set of values, the first audio track with a first pre-defined mood, and storing a mapping between the first audio track and the first pre-defined mood.

10. In some embodiments, one or more non-transitory computer-readable media including instructions that, when executed by one or more processors, cause the one or more processors to execute the steps of receiving a first input that indicates a first mood of the user, selecting a first acoustic profile associated with the first mood of the user, wherein the first acoustic profile includes a first set of acoustic parameters, and causing an audio output device to output a first output audio signal based on the first set of acoustic parameters.

11. The non-transitory computer-readable media of clause 10, further comprising instructions that, when executed by the one or more processors, cause the one or more processors to perform the step of determining the first mood of the user based on the first input, wherein the first input comprises a first set of user parameters.

12. The non-transitory computer-readable media of clause 10 or 11, further comprising instructions that, when executed by the one or more processors, cause the one or more processors to perform the steps of determining, based on the first set of user parameters, a first set of mood parameters that includes a first arousal value and a first valence value, a second set of mood parameters that includes a second arousal value and a second valence value, generating a composite set of mood parameters based on at least the first set of mood parameters and the second set of mood parameters, and determining the first mood of the user based on the composite set of mood parameters.

13. The non-transitory computer-readable media of any of clauses 10-12, further comprising instructions that, when executed by the one or more processors, cause the one or more processors to perform the step of providing, based on the first mood of the user, a recommendation for a first audio track, wherein the first output audio signal corresponds to the first audio track.

14. The non-transitory computer-readable media of any of clauses 10-13, where the first acoustic profile is included in a plurality of pre-defined acoustic profiles, wherein each pre-defined acoustic profile corresponds to at least one pre-defined mood.

15. The non-transitory computer-readable media of any of clauses 10-14, where the first set of acoustic parameters modify at least one operating feature of a first filter included in the audio output device, the first set acoustic parameters including at least one of a center frequency parameter, a Q factor parameter, and a set of gain parameters.

16. The non-transitory computer-readable media of any of clauses 10-15, where the first set of acoustic parameters includes at least one spatialization parameter, wherein the audio device outputs the first output audio signal based to on the at least one spatialization parameter to indicate a first point source origin perceived by the user.

17. The non-transitory computer-readable media of any of clauses 10-16, further comprising after causing the audio output device to output the first output audio signal, determining a second mood of the user, wherein the second mood is different than the first mood, selecting, a second acoustic profile associated with the second mood of the user, wherein the second acoustic profile includes a second set of acoustic parameters, and causing the audio output device to output a second output audio signal based on the second set of acoustic parameters.

18. In some embodiments, a personalized audio system comprises at least one sensor configured to produce first biometric data, a memory configured to store a first acoustic profile, and a processor coupled to the at least one sensor and the memory, the processor configured to receive the first biometric data, determine the first mood of the user based on the first biometric data, select, based on the first mood of the user, the first acoustic profile, wherein the first acoustic profile includes a first set of acoustic parameters, and cause an audio output device to reproduce a first input audio signal based on the first set of acoustic parameters.

19. The personalized audio system of clause 18, where the first biometric data includes at least one of a heart rate, a pupil size, a galvanic skin response, a blood pressure level, and an average blood glucose concentration.

20. The personalized audio system of clause 18 or 19, where the processor is further configured to after causing the audio output device to reproduce the first audio signal, determine a second mood of the user based on at least one of a first set of user parameters and second biometric data, wherein the second mood is different than the first mood, select, based on the second mood of the user, a second acoustic profile, wherein the second acoustic profile includes a second set of acoustic parameters, and cause the audio output device to reproduce a second audio signal based on the second set of acoustic parameters.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for providing a personalized audio signal to a user, the method comprising:
   classifying, based on a first set of user data, a first user mood of the user;
   selecting, based on the first user mood, a first set of acoustic parameters corresponding to the first user mood, wherein the first set of acoustic parameters modify operation of one or more filters when filtering an input audio signal;
   filtering, based on the first set of acoustic parameters, a first input audio signal to generate a filtered first input audio signal; and
   causing an audio output device to reproduce the filtered first input audio signal.

2. The computer-implemented method of claim 1, further comprising:
   receiving a first audio track; and
   generating a first set of values reflecting acoustic characteristics of the first audio track.

3. The computer-implemented method of claim 1, further comprising:
   after causing the audio output device to reproduce the filtered first input audio signal, classifying, based on a second set of user data, a second user mood for the user that is different than the first user mood;
   selecting, based on the second user mood, a second set of acoustic parameters corresponding to the second user mood, wherein the second set of acoustic parameters modify the operation of the one or more filters when filtering the input audio signal;
   filtering, based on the second set of acoustic parameters, a second input audio signal to generate a filtered second input audio signal; and
   causing the audio output device to reproduce the filtered second input audio signal.

4. The computer-implemented method of claim 1, wherein the first set of user data includes biometric data associated with the user, the biometric data including at least one of a heart rate, a pupil size, or a galvanic skin response.

5. The computer-implemented method of claim 1, wherein the first set of user data includes a first set of user data received from an application, wherein the first set of user data includes at least one of a location of the user or a calendar entry.

6. The computer-implemented method of claim 1, further comprising:
   determining, based on a second set of user data, a target mood of the user, wherein the target mood is different than the first user mood;
   selecting, based on the target mood of the user, a second set of acoustic parameters corresponding to the target mood of the user, wherein the second set of acoustic parameters modify the operation of the one or more filters when filtering the input audio signal;
   filtering, based on the second set of acoustic parameters instead of the first set of acoustic parameters, a second input audio signal to generate a filtered second input audio signal; and
   causing the audio output device to reproduce the filtered second input audio signal.

7. The computer-implemented method of claim 1, further comprising:
   generating a first set of values reflecting acoustic characteristics of a first audio track;
   associating, based on the first set of values, the first audio track with a first pre-defined mood; and
   storing a mapping between the first audio track and the first pre-defined mood.

8. One or more non-transitory computer-readable media including instructions that, when executed by one or more processors, cause the one or more processors to execute the steps of:
   classifying, based on a first set of user data, a first user mood of a user;
   selecting, based on the first user mood, a first set of acoustic parameters corresponding to the first user mood, wherein the first set of acoustic parameters modify operation of one or more filters when filtering an input audio signal;
   filtering, based on the first set of acoustic parameters, a first input audio signal to generate a filtered first input audio signal; and
   causing an audio output device to reproduce the filtered first input audio signal.

9. The one or more non-transitory computer-readable media of claim 8, further comprising instructions that, when executed by the one or more processors, cause the one or more processors to perform the step of providing, based on the first user mood, a recommendation for a first audio track, wherein the first input audio signal corresponds to the first audio track.

10. The one or more non-transitory computer-readable media of claim 8, wherein the first set of acoustic parameters is included in a plurality of pre-defined acoustic parameter sets, wherein each pre-defined acoustic parameter set corresponds to at least one pre-defined mood.

11. The one or more non-transitory computer-readable media of claim 8, wherein the first set of acoustic parameters includes at least one of a center frequency parameter value, a Q factor parameter value, or a set of gain parameter values.

12. The one or more non-transitory computer-readable media of claim 8, further comprising:
   after causing the audio output device to reproduce the filtered first input audio signal, classifying, based on a second set of user data, a second user mood for the user that is different than the first user mood;
   selecting, based on the second user mood, a second set of acoustic parameters corresponding to the second user mood, wherein the second set of acoustic parameters modify the operation of the one or more filters when filtering the input audio signal;
   filtering, based on the second set of acoustic parameters, a second input audio signal to generate a filtered second input audio signal; and
   causing the audio output device to reproduce the filtered second input audio signal.

13. A personalized audio system comprising:
   at least one sensor configured to produce first biometric data of a user;
   a memory configured to store a first set of acoustic parameters to modify operation of one or more filters when filtering an input audio signal; and
   a processor coupled to the at least one sensor and the memory, the processor configured to:
      receive the first biometric data;
      classify, based on the first biometric data, a first user mood of the user;

select, based on the first user mood, a first set of acoustic parameters corresponding to the first user mood;

filter, based on the first set of acoustic parameters, a first input audio signal to generate a filtered first input audio signal; and cause an audio output device to reproduce the filtered first input audio signal.

14. The personalized audio system of claim 13, wherein the first biometric data includes at least one of a heart rate, a pupil size, or a galvanic skin response.

15. The personalized audio system of claim 13, wherein the processor is further configured to:

after causing the audio output device to reproduce the filtered first input audio signal, classifying, based on second biometric data, a second user mood for the user that is different than the first user mood;

select, based on the second user mood a second set of acoustic parameters corresponding to the second user mood, wherein the second set of acoustic parameters modify the operation of the one or more filters when filtering the input audio signal;

filter, based on the second set of acoustic parameters, a second input audio signal to generate a filtered second input audio signal; and cause the audio output device to reproduce the filtered second input audio signal.

* * * * *